Nov. 9, 1948.  A. G. SCHRAMM  2,453,388
TRAILER CONSTRUCTION
Filed Sept. 17, 1945  2 Sheets-Sheet 1

INVENTOR
Arthur G. Schramm

Nov. 9, 1948.        A. G. SCHRAMM        2,453,388
                    TRAILER CONSTRUCTION
Filed Sept. 17, 1945                    2 Sheets-Sheet 2

INVENTOR
Arthur G. Schramm
By Scott L. Nourie
attorney

Patented Nov. 9, 1948

2,453,388

UNITED STATES PATENT OFFICE 2,453,388

TRAILER CONSTRUCTION

Arthur G. Schramm, Phoenix, Ariz.

Application September 17, 1945, Serial No. 616,722

3 Claims. (Cl. 280—33.4)

This invention pertains to automobile trailers and particularly to wheel suspension of trailers of this class, and has for its objects:

First, the provision of a trailer having a pair of independently sprung wheels of each side of the body which are vertically adjustable to raise and lower the height of the trailer bed.

Second, the provision of a trailer having a body bed, riding wheels on each side thereof, each suspended on arms controlled by levers sprung to provide adequate resiliency for riding; said arms being arcuately adjustable relative to the plane of the bed.

Third, a trailer having a bed and riding wheels running on axles supported on arms pivotally attached by shafts on each side of said body; these wheels each being adjustably maintained in riding position by a second crank on said supporting shaft, connected by links to the outer end of a leaf spring held in a clamp on a revolvable spring supporting shaft.

Fourth, to provide mechanism for rotating the spring supporting shaft, so that the position of the wheel supporting arms may be varied and the loaded trailer may be lifted from the ground by revolving the wheel supporting arms and thus lowering the wheels.

Other objects will appear hereinafter.

I attain the foregoing objects by means of the construction and mechanism shown in the accompanying drawings, in which—

Figure 1:
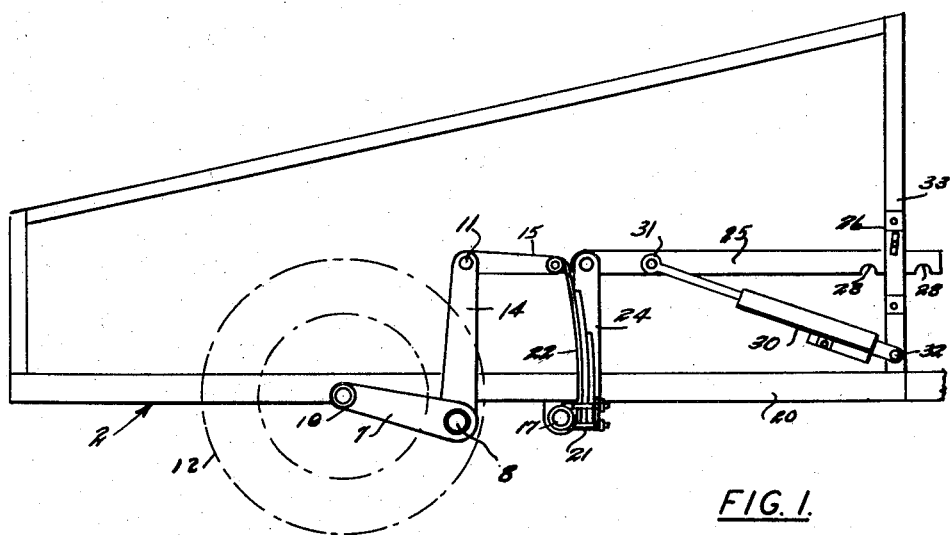
Figure 1 is a side elevation of one form of trailer, including my improvements.
Figure 2:
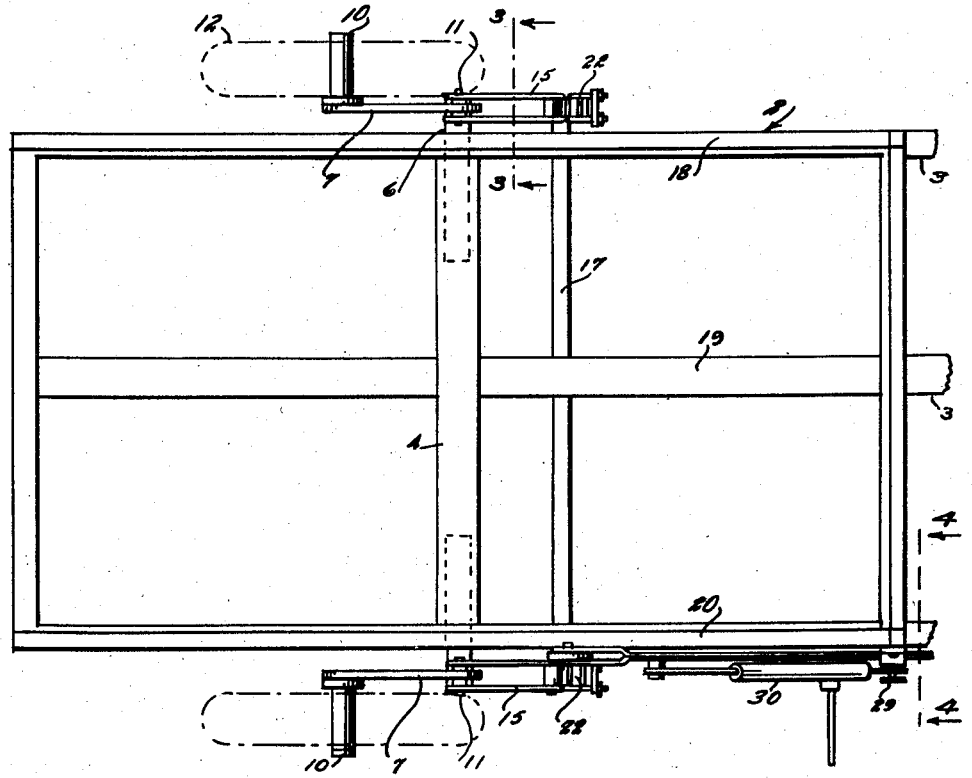
Figure 2 is a plan view thereof.
Figures 3, 4:
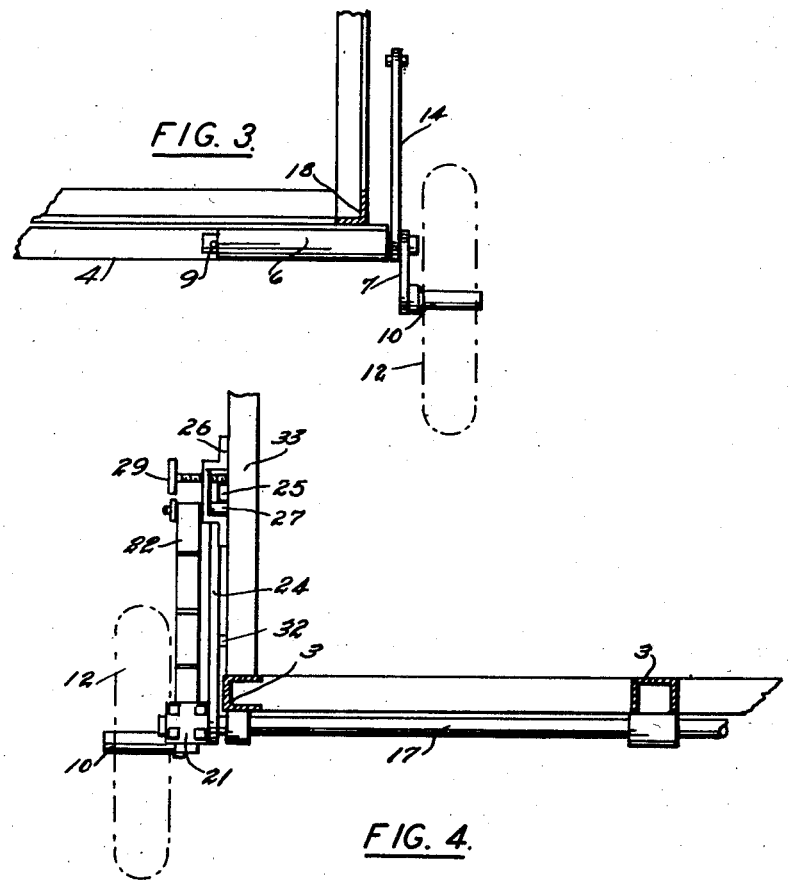
Figure 3 is a sectional view of the wheel axle arm, and its support taken substantially on lines 3—3, Figure 2.
Figure 4 is a fragmentary elevational view taken substantially from line 4—4, Figure 2.

The bed of the trailer is made of angle steel in a conventional form, and it is to be understood that a hitching tongue extends forward from the front end of this frame on supports 3, broken away at the front end of the drawing.

Transverse of the middle of the frame is a body member constituting an axle arm shaft housing 4, made of channel bar opening downward.

In each end of this member, tubes 6 are welded. These form axle arm shaft bearings.

Each axle arm 7 is made of heavy plate or a forging and is welded at its inner end to arm shafts 8, which journal in tubes 6, and are held against removal by pins 9. At the outer end of these arms are stub axles 10, which are provided with the usual wheel bearings to receive the wheels 12.

Axle arm shaft cranks 14 are welded to shafts 8 from which they extend at an angle of slightly less than 90 degrees relative to arms 7. At the top, each crank is provided with a cross pin 11 to receive the rear end of spring links 15.

Forward of the transverse body member 4, is a transverse shaft 17 extending through and journalled on longitudinal body members 18, 19 and 20. At each end of this shaft, which may be termed the spring supporting shaft, spring seats 21 are welded. Quarter elliptical leaf springs 22 are attached to these seats by the usual clamps.

The right end of shaft 17 carries a spring positioning crank 24. This extends upward so as to be substantially parallel to its adjacent spring. Its position is controlled by a horizontal bar 25, which is pinned to it at the top end and extends forward through a loop 26 on vertical frame member 33. Bar 25 has notches 28 cut on its under edge adapted to engage over a boss 27 formed in the bottom of loop 26. T screw 29 is threaded through loop 26, and is positioned to hold the bar down with notches engaging boss 27 when threaded all the way in.

A hand actuated hydraulic jack 30 is positioned between a pin bearing 31 on bar 25 near its support on crank 24, and a pin bearing 32 on vertical body frame member 33. It extends and operates diagonally.

When actuated, the jack raises bar 25 and disengages notches 28 from boss 27, and then, when further actuated, moves it rearwardly. The bar slides along the top of the enclosing loop, and its rearward motion pushes the top of crank 24 to the rear. This rotates shaft 17 in a counter-clockwise direction and the outer ends of each spring move toward the rear of the trailer. Cranks 14 are, accordingly forced to the rear and wheel arms 7 are forced downward, carrying the wheels downward toward the ground, and raising the trailer body. When the pressure is released from the jack, the reverse operation takes place and the body can be lowered until it rests on the ground. The trailer can be loaded on the ground and then can be lifted, as above described. The horizontal bar acts as a stop by engagement of its notches over the loop boss. When engaged it is secured in position by screw 29.

From the foregoing, it will be seen that each trailer wheel is supported on its axle by an arm pivotally supported on the trailer frame. Each wheel supporting arm is connected by a link to a spring clamped to a rotatively adjustable seat.

The shafts carrying the wheel axle arms can be rotated simultaneously by rotating the shaft 17 carrying the springs. The length of each arm 7 is slightly greater than the radius of each wheel. Rotation of the wheel arm supporting shafts 8 can move the wheels from a position where they are elevated above the trailer bed to the position shown in Figure 1.

In the former position the trailer bed rests on the ground and the trailer can be easily loaded. This is particularly valuable when loading livestock or heavy objects. After loading the wheels can be lowered and the trailer body raised to running position.

The structure and mechanism, including the horizontal position locking bar 25 and the jack 30, may be varied in numerous ways. However, in the preferred form, here shown, it will be noted that, after releasing the locking screw 29, operation of the jack first lifts bar 25 free of engagement with boss 27 and then automatically moves the bar, and its supporting crank to effect lowering of the wheels. The jack may be operated manually, as shown, or suitable power mechanism substituted if desired.

Having now fully described my invention and explained its operation, I wish to be limited only by the following claims:

I claim:

1. Trailer construction comprising, in combination, a trailer body having a bed, axle arm shaft bearings supported on said bed, axle arms having stub wheel axles, extending outward from their outer ends and axle arm shafts extending inwardly from their inner ends and journalled in said axle arm shaft bearings, wheels mounted on said axles, cranks attached to said axle arm shafts extending angularly relative to said axle arms, a spring supporting shaft journalled in said bed and extending transversely thereof positioned on said frame forward of said axle arm shafts so as to clear the periphery of said wheels, quarter ellipitcal springs retained in bedding blocks on the ends of said shaft links connecting the outer ends of said springs to said cranks on said axle arm shafts, and mechanism for rotating said spring holding shaft and releasably retaining it at predetermined positions, including a crank arm mounted on said spring supporting shaft, a bar pivoted thereon adapted to retention at predetermined positions on said trailer body, and a jack operative between said trailer body and the end of said arm.

2. Trailer construction comprising, in combination, a trailer body having a bed, axle arm shaft bearings supported on said bed, axle arms having stub wheel axles, extending outward from their outer ends and axle arm shafts extending inwardly from their inner ends and journalled in said axle arm shaft bearings, wheels mounted on said axles, cranks attached to said axle arm shafts extending angularly relative to said axle arms, a spring supporting shaft journalled in said bed and extending transversely thereof, quarter elliptical springs retained in bedding blocks on the ends of said shaft links connecting the outer ends of said springs to said cranks on said axle arm shafts, and mechanism for rotating said spring holding shaft and releasably retaining it at predetermined positions, said mechanism including a horizontal bar pivoted to a crank on said spring supporting shaft having notches adapted to engage a locking boss on said trailer frame, and a jack mounted on said trailer frame and operative angularly on said bar to provide upward and longitudinal movement whereby said shaft crank may be moved to rotate the bedding blocks supporting said springs and said bar be maintained out of engagement with said boss.

3. Trailer construction comprising, in combination with a trailer body having a bed, adjustable wheel suspension, including axle arms pivotally mounted on each side of said trailer bed, outwardly extending axles on the outer ends thereof, riding wheels mounted on said axles, rotatably adjustable bedding blocks operable on each side of said trailer-bed and mounted on a common transverse shaft, positioned forward of the pivotal mounting of said axle arms on said trailer-bed. springs mounted on said bedding blocks, and mechanism including linkage connecting said springs to said axle arms whereby said axle arms may be rotated on their pivotal mounts and coincidentally maintained resiliently in position, and means for rotating and positioning the bedding blocks carrying said springs, including a crank on said transverse shaft, a locking bar operably attached to the end thereof, having latching notches formed therealong, latching means on said trailer-bed adapted to engage said notches, and a hydraulic jack operably connected to said crank to rotate said transverse shaft.

ARTHUR G. SCHRAMM.

REFERENCES CITED

The following references are of record in the file of this patent:

UNITED STATES PATENTS

| Number | Name | Date |
| --- | --- | --- |
| 2,139,592 | Kirby | Dec. 6, 1938 |
| 2,141,781 | Allen | Dec. 27, 1938 |
| 2,348,445 | Bayer | May 9, 1944 |